United States Patent [19]
Heine

[11] 3,861,789
[45] *Jan. 21, 1975

[54] WIDE-ANGLE OPHTHALMOSCOPE

[75] Inventor: Helmut A. Heine, Herrsching, Upper Bavaria, Germany

[73] Assignees: Optotechnik Heine KG, Herrsching 10BB, Germany; Propper Manufacturing Company, Inc., Long Island City, N.Y.

[ * ] Notice: The portion of the term of this patent subsequent to Aug. 17, 1988, has been disclaimed.

[22] Filed: May 23, 1973

[21] Appl. No.: 363,240

[52] U.S. Cl. .................................... 351/12, 351/16
[51] Int. Cl. ............................................. A61b 3/12
[58] Field of Search .................. 351/12, 10, 11, 16

[56] References Cited
UNITED STATES PATENTS
1,774,832  9/1930  Keeler .................................. 351/12
3,600,067  8/1971  Heine .................................. 351/12

FOREIGN PATENTS OR APPLICATIONS
676,843  8/1952  Great Britain ....................... 351/12

Primary Examiner—Paul M. Sacher
Attorney, Agent, or Firm—Blum, Moscovitz, Friedman & Kaplan

[57] ABSTRACT

A hand-held ophthalmoscope having a light source and a light-deflector situated along a given optical axis for directing light to an eye which is to be viewed. Along this optical axis there is also a wide-angle objective for focusing the light at the eye which is to be examined.

7 Claims, 3 Drawing Figures

WIDE-ANGLE OPHTHALMOSCOPE

BACKGROUND OF THE INVENTION

The present invention relates to ophthalmoscopes.

As is well known, optical instruments of this type are utilized for observing the background of a living human or animal eye.

The present invention relates in particular to ophthalmoscopes of the type disclosed in U.S. Pat. No. 3,600,067.

In general, an ophthalmoscope of this latter type has proved to a highly satisfactory in every way. However, for certain purposes it is desired to spread the illumination over a relatively large area, so as to illuminate the eye which is to be examined in a manner which will permit the observer to see at a single observation a desired area of the eye. In other words, while the instrument disclosed in U.S. Pat. No. 3,600,067 is highly satisfactory, it has been found that for some purposes it is necessary to move the instrument with respect to the eye which is to be observed in order to move the light over the area which is to be observed. This required movement of the ophthalmoscope with respect to the area which is to be observed creates a certain inconvenience.

SUMMARY OF THE INVENTION

It is accordingly a primary object of the present invention to provide an ophthalmoscope which will avoid the above drawbacks.

In particular, it is an object of the present invention to provide for an ophthalmoscope of the above type an improvement which will reduce the extent to which the instrument must be moved relative to the eye in order to observe a desired area.

In particular, it is an object of the present invention to provide an ophthalmoscope of the above general type which is capable of utilizing the characteristics of a wide-angle objective in order to enable observation of a relatively large area while still remaining close to the area which is observed.

Thus, in accordance with these objects, the present invention includes in an opthalmoscope an optical system for directing light from a light source to a light-deflecting means which directs the light from the light source to the eye which is to be observed. These components are situated along an optical axis in a hollow housing, and along this optical axis there is also a wide-angle objective for enabling the light to illuminate a relatively large area while at the same time the operator need not increase the distance between the eye and the instrument in order to increase the illuminated area, and at the same time the extent of movement of the instrument with respect to the eye can be substantially reduced.

BRIEF DESCRIPTION OF DRAWINGS

The invention is illustrated by way of example in the accompanying drawings which form part of this application and in which.

DESCRIPTION OF A PREFERRED EMBODIMENT

Figure 1:
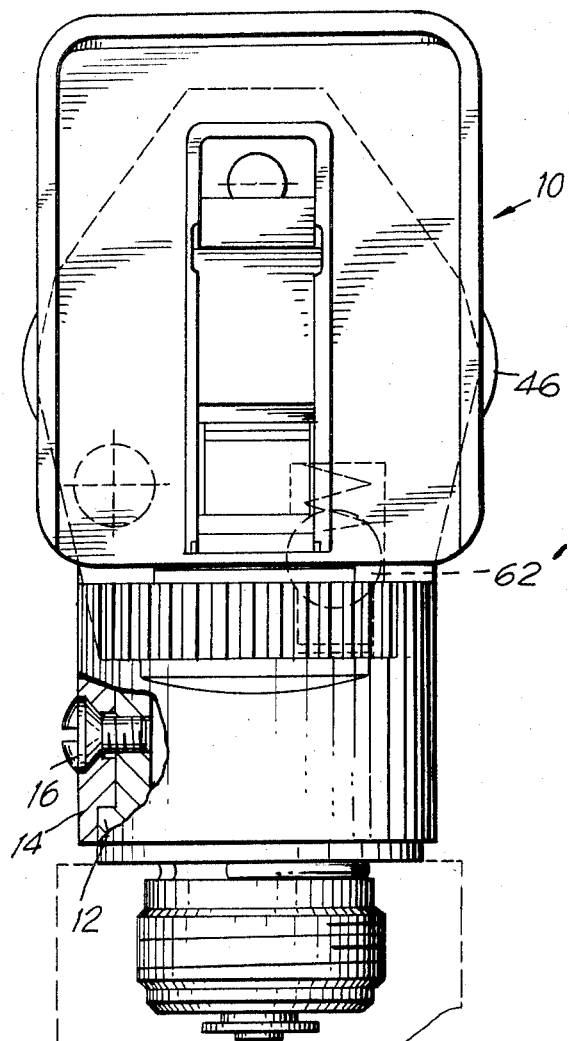
FIG. 1 is a partly sectional front elevation of an ophthalmoscope according to the invention as it appears when looking toward that side thereof which is directed toward the eye which is to be observed.
Figure 2:
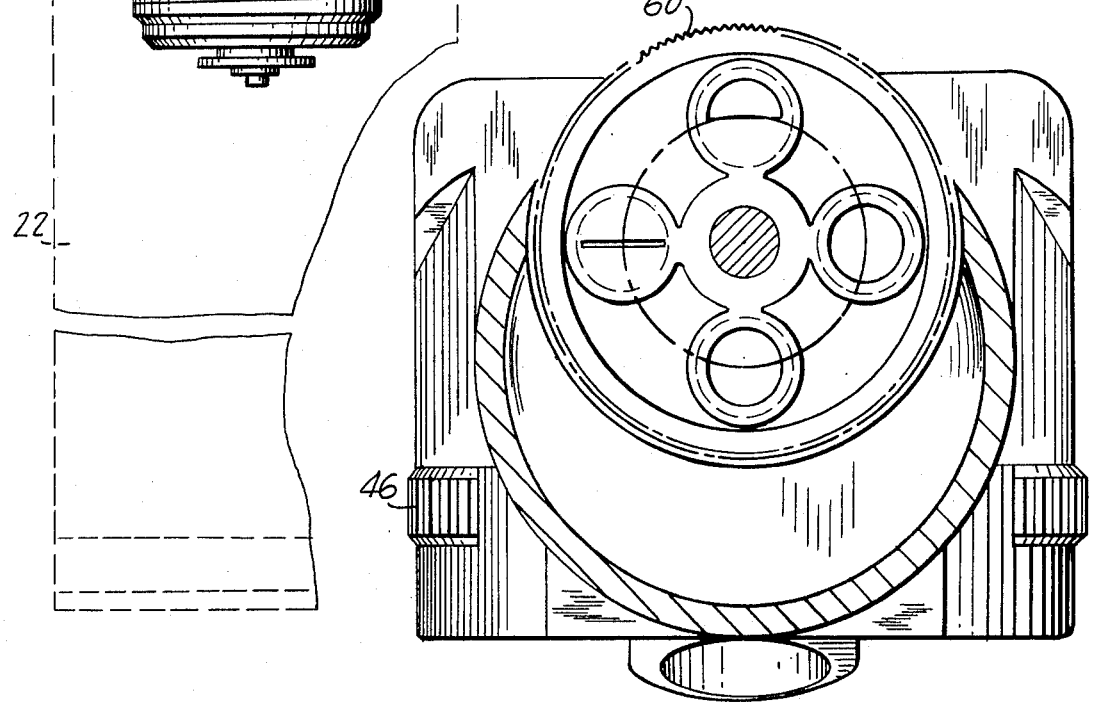
FIG. 2 is a transverse sectional view of the ophthalmoscope taken along line 2—2 of FIG. 3 in the direction of the arrows.

Referring to the drawings, the illustated ophthalmoscope includes a housng means 10 having a lower tubular portion 12 on which an upper hollow portion 14 is mounted. Thus, the upper end of the tubular portion 12 is received in a lower part of the hollow housing 14, with these components being fixed to each other as by a screw 16 (FIG. 1).

The lower part 12 of the hollow housing 10 carries a light source 18, in the form of a small incandescent bulb, for example. The lower portion 12 is provided with a bayonet fastener 20 or the like, by means of which a hollow casing 22 may be releasably fixed to the lower portion 12, as shown in phantom lines in FIG. 1. This hollow casing 22 serves as a handle and also serves to house batteries forming a source of energy for the light source 18.

Situated within the portion 12 directly over the light source 18 is a condenser lens 24. This condenser lens 24 together with the light source 18 are located along an optical axis 26. The light travels through the hollow interior of housing part 14 along the optical axis 26 up to a light-deflecting means 28 in the form of a suitable mirror or other light-reflecting component capable of deflecting the light to the left, as viewed in FIG. 3, toward the eye which is to be observed. For this purpose the light travels out through an opening 30 at the left inclined wall of the hollow housing part 14, as viewed in FIG. 3. This opening 30 is capable of being closed by a manually shiftable cover slide 32. Thus when it is desired to use the ophthalmoscope the slide 32 is moved down to the position shown in FIG. 3 so that through the opening 30 the light can travel from the light-deflecting means 28 to the eye which is to be observed.

For the purpose of observing the eye, the hollow housing component 14 has a rear opening 34 covered by a suitable transparent plate 36. Through this opening 34 it is possible for the observer to view the eye over the top edge of the light- deflecting means 28.

The rear wall of the hollow housing component 14 is separate from the remainder of the housing. This rear wall has an inwardly extending tubular extension 38 received on a boss 40 of the remainder of the housing, the rear wall being fixed in position by the screw 42 received in the threaded bore of a component which is fixed in the interior of the boss 40.

The tubular extension 38 serves to support the rotary movement a wheel 44 which is formed adjacent its outer periphery with a series of openings receiving different lenses to accommodate the ophthalmoscope to correct refraction errors of the patient and observer. The wheel 44 may be made of a transluscent material so that light can travel therethrough, and the wheel 44 has an outer knurled periphery 46 accessible at the exterior of the housing so that the operator can readily turn the wheel 44. The wheel 44 carries at its right face, as viewed in FIG. 3, indicia indicating the particular lens which is placed in alignment with the opening 34. Thus, opposite each lens there is indicia identifying the same, and this indicia is visible through the opening 48 which is closed by a transparent lens 50.

Figure 3:
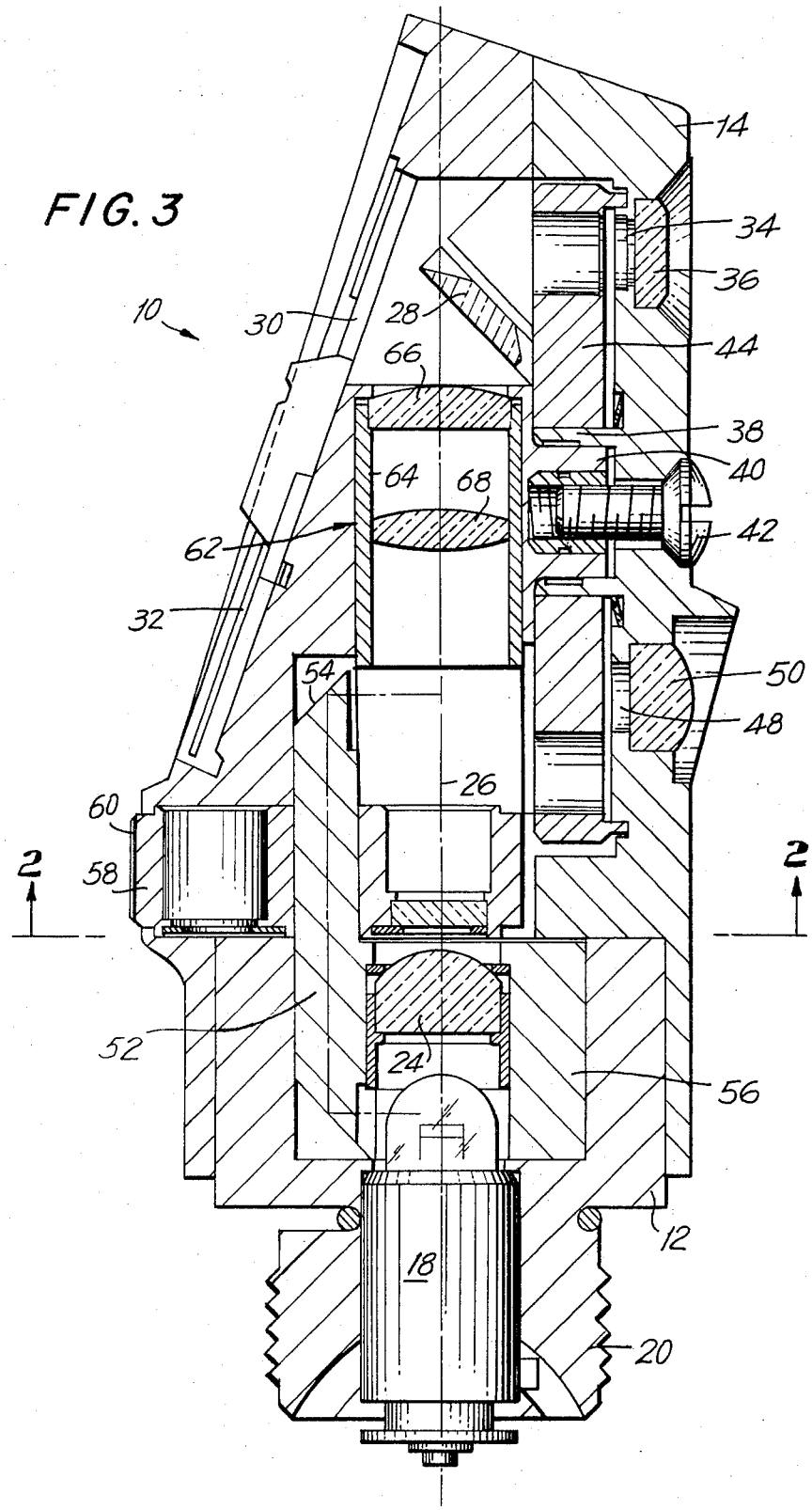
FIG. 3 is a longitudinal sectional elevation of the ophthalmoscope, taken in a plane which contains the optical axis.

In order to illuminate the wheel 44, part of the light from the source 18 is received by a light-conducting rod 52 having opposed oppositely inclined ends so that this rod acts as a prism for directing the light travelling through the rod 52 from the end 54 thereof to the right, as viewed in FIG. 3, toward the wheel 44 so as to illuminate the indicia thereof visible through the lens 50.

This rod 52 extends integrally from a tubular component 56 which is received in the lower portion 12 of the housing 10, and it is this portion 56 which carries the condenser 24.

Also, the rod 52 acts as a shaft on which a rotary wheel 58 is mounted. This wheel 58 has an exterior knurled periphery 60 accessible to the operator, and a spring-pressed ball 62', shown in dotted lines in FIG. 1, engages one of a series of openings formed in the wheel 58 for releasably holding the latter at a selected one of a plurality of different angular positions. These openings of the rotary wheel 58 carry aperture members, or in other words diaphragm components, so that in accordance with a selected angular position of the wheel 58 a given aperture will be situated along the optical axis 26 in close proximity to the condenser lens 24. These openings in the wheel 58 may also carry suitable color filters which aid in observation of the eye.

In accordance with the present invention there is situated along the optical axis 26 between the wheel 58 and the light-deflecting means 28 a wide-angle objective 62. This objective 62 includes the outer tubular lens barrel 64 which is received with a suitable tight fit in an opening of the housing 10. At its end which is adjacent the light-deflecting means 28, the objective 62 includes a normal lens 66, while between the latter and the wheel 58 the objective 62 includes an image-forming wide-angle lens 68.

It will be noted that the hollow housing means 10 is completely closed except for the opening 30 through which light travels to the eye which is to be observed. Therefore, the light which travels along lthe optical axis 26 beyond the objective 62 to the reflecting means 28 will be very efficiently directed toward the eye which is to be observed inasmuch as the light is not free to stray out into the open space and can only travel through the opening 30. In addition, the fact that the light from the objective 62 is reflected to the eye by the flat reflecting surface of the reflecting means 28 also is of significance inasmuch as there is very little light loss with the pure reflection which takes place in this way. Thus, the space between the objective 62 and the reflecting surface of the reflecting means 28 is completely free and open so that there is nothing in this space to absorb light or otherwise cut down on the intensity of the illumination of the eye which is to be observed. In this connection also the closeness of the lens 66 to the reflector 28 is of significance.

Thus, the fact that through the wide angle feature of the invention it will be possible to observe a large area at the eye while still remaining close thereto renders these latter features of considerable significance since a highly efficient transmission of light will provide an effective illumination of the large area, and such a highly efficient light transmission is achieved with the above features.

Thus, by reason of the presence of the wide-angle objective 62 in the combination described above, the light issuing from the source 18 will be directed over a relatively wide angle to cover a relatively large area of the observed eye, enabling the ophthalmoscope of the invention to be used for examination of an eye in a manner which will avoid excessive movement of the ophthalmoscope with respect to the eye while still enabling the ophthalmoscope to be located quite close to the eye.

What is claimed is:

1. In a hand-held ophthalmoscope, a housing having a hollow interior, an optical illuminating system carried by said housing in the interior thereof and including a light source and a light-deflecting means for directing light along an optical axis of said illuminating system from said light source toward an eye which is to be viewed, said optical illuminating system including a wide angle objective situated along said optical axis between said light source and said light-deflecting means, an observation system also carried by said housing and including a rotary lens wheel carrying a plurality of lenses for situating a selected lens along an observation light path of the observation system at that part thereof through which the operator observes the eye, said rotary lens wheel being supported for rotary movement by said housing and being made of a transparent material provided with an inner surface directed toward and communicating with the interior of the housing at an interior portion thereof which is axially displaced along said optical axis from said light source between the latter and said light-deflecting means and said rotary lens wheel having an outer surface directed outwardly toward the operator and carrying indicia for respectively indicating which of the lenses of the lens wheel is in an operative position at the observation path, and light-conducting means situated entirely in the interior of said housing and being spaced in its entirety radially beyond said optical axis and extending parallel to said optical axis from a location situated beside said light source to a location communicating with said interior portion of said housing with which said inner surface of said rotary lens wheel communicates for receiving light radiating radially from said light source and for conducting the received light along a path spaced radially beyond and extending parallel to said optical axis into said interior portion of said housing to illuminate said inner surface of said transparent lens wheel for directing through the latter light which illuminates the indicia even in the dark, so that the operator knows which of the lenses has been located at the observation path.

2. The combination of claim 1 and wherein said objective icludes a normal lens at one end of the objective and a wide angle image-producing lens spaced from said normal lens.

3. The combination of claim 2 and wherein said normal lens is between said wide-angle lens and said light-deflecting means while said wide-angle lens is between said normal lens and said light source.

4. The combination of claim 3 and wherein a condenser lens is situated between said light source and said wide-angle lens along said optical axis in close proximity to said light source.

5. The combination of claim 4 and wherein an aperture means is situated between said condenser lens and said wide-angle lens in close proximity to said condenser lens.

6. The combination of claim 5 and wherein said aperture means includes a rotary wheel supported for rotation by said housing about an axis parallel to but spaced from said optical axis and formed with a plurality of different apertures any one of which may be selectively situated along the optical axis.

7. The combination of claim 2 and wherein said normal lens is situated in close proximity to said light-deflecting means.

* * * * *